US009244792B1

(12) United States Patent
Fischer et al.

(10) Patent No.: US 9,244,792 B1
(45) Date of Patent: Jan. 26, 2016

(54) DISK-MEDIA-ERROR DETECTION AND CORRECTION

(71) Applicant: TERADATA US, INC., Dayton, OH (US)

(72) Inventors: Matthew James Fischer, Escondido, CA (US); Scott Eymann Stucky, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 104 days.

(21) Appl. No.: 13/731,532

(22) Filed: Dec. 31, 2012

(51) Int. Cl.
*G06F 11/00* (2006.01)
*G06F 11/26* (2006.01)

(52) U.S. Cl.
CPC ..................... *G06F 11/26* (2013.01)

(58) Field of Classification Search
CPC ........... G11B 2220/20; G11B 20/1883; G11C 29/56; G06F 11/0727; G06F 11/26
USPC .......................................................... 714/42
See application file for complete search history.

(56) References Cited

U.S. PATENT DOCUMENTS

| 7,711,995 | B1* | 5/2010 | Morris ................... G11B 27/36 711/161 |
| 7,971,093 | B1* | 6/2011 | Goel et al. .................... 714/6.22 |
| 2006/0039196 | A1* | 2/2006 | Gorobets et al. ......... 365/185.01 |
| 2011/0231730 | A1* | 9/2011 | Allen ............................ 714/758 |
| 2014/0062759 | A1* | 3/2014 | Morikawa ............... G01S 17/42 342/59 |

OTHER PUBLICATIONS

An Analysis of Latent Sector Errors in Disk Drives, Bairavasundaram, et. al, Sigmetrics 07 Conference Proceedings, 2007, vol. 35, Issue 1, p. 289-300.

\* cited by examiner

*Primary Examiner* — Yair Leibovich
(74) *Attorney, Agent, or Firm* — Randy L. Campbell, Jr.

(57) ABSTRACT

A disk-error detection system may include a storage array having a plurality of storage disks configured to store data. The disk-error detection system may include a processor in communication with the storage disks. The processor may detect presence of a media error in a storage disk from the plurality of storage disks during a read operation of the data stored on the storage disk. The processor may perform a media-error detection scan of a predetermined portion of the storage disk in response to the detection of the media error. The location on the storage disk of the predetermined portion of the storage disk may be based on location of the media error on the storage disk. A method and computer-readable medium may also implement disk-error detection.

20 Claims, 6 Drawing Sheets

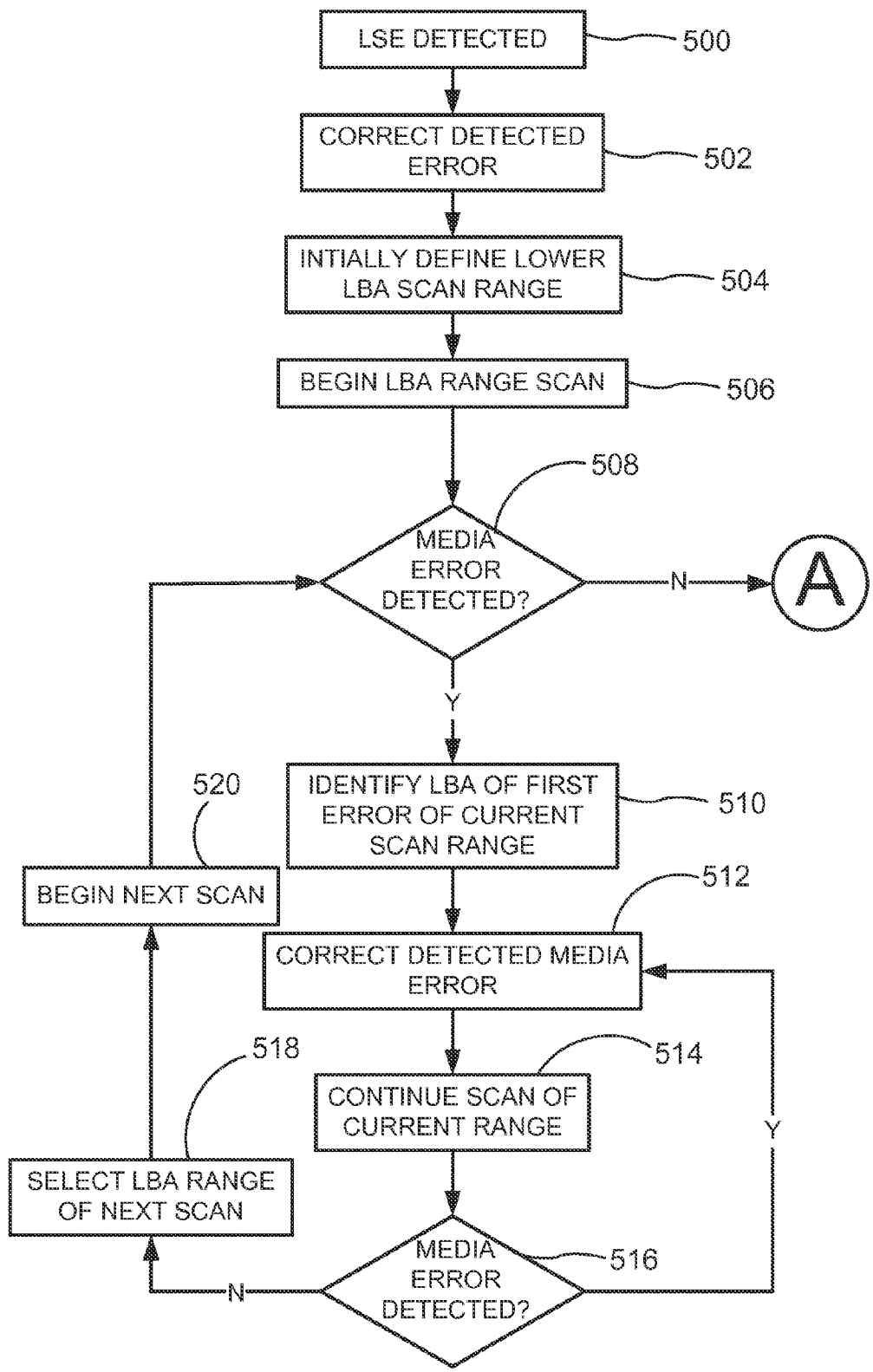

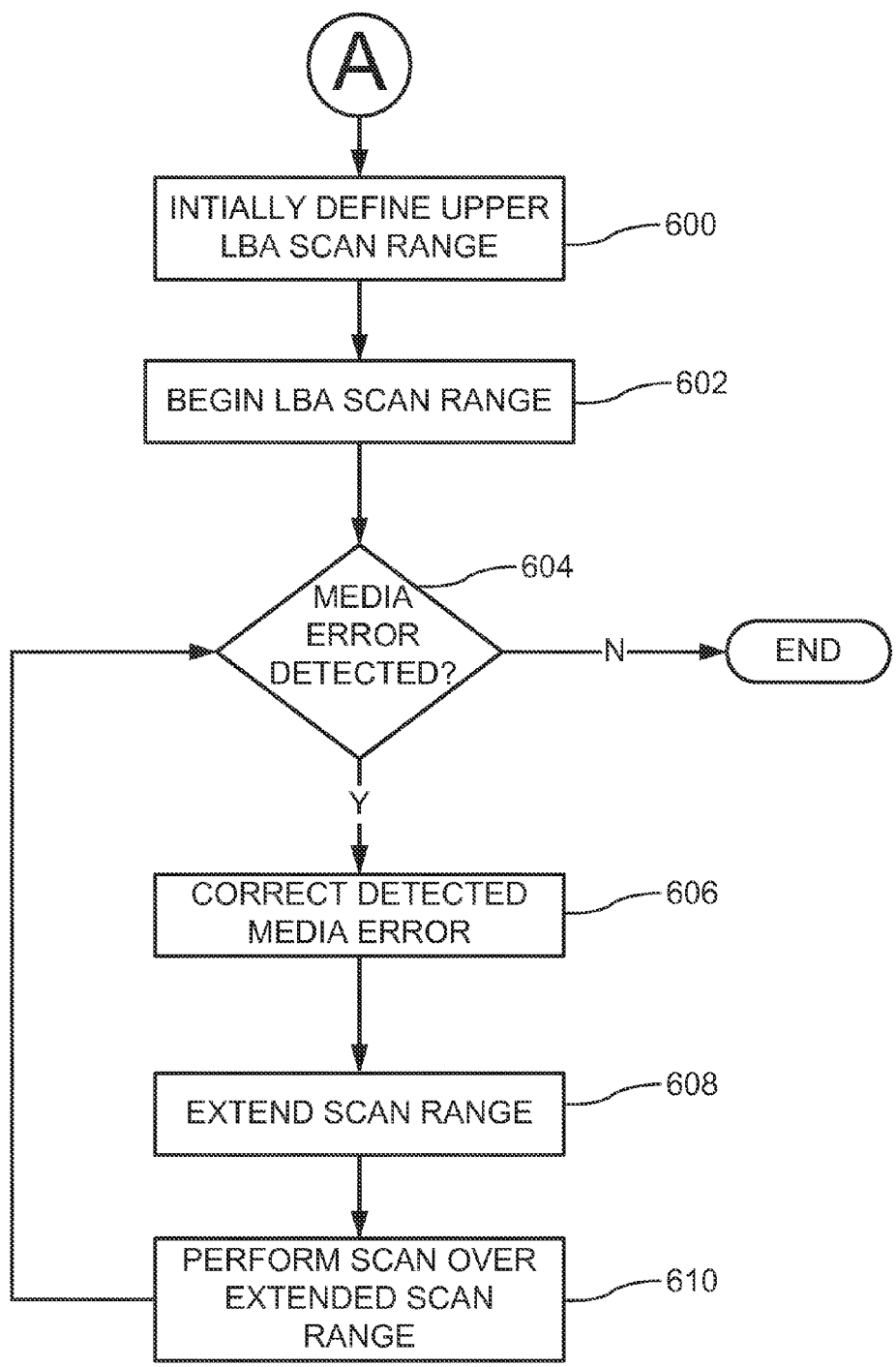

DISK-MEDIA-ERROR DETECTION AND CORRECTION

BACKGROUND

1. Technical Field

The present disclosure relates generally to media error detection, and in particular, to detection of media errors in disks proximate to previously found media errors.

2. Related Art

Latent sector errors (LSEs) that occur on hard disk drives (HDDs) within a redundant array of independent disk (RAID) subsystem are typically recoverable when the RAID group is otherwise healthy. However, if RAID redundancy is already compromised (due to disk failure, as an example), the detection of an LSE on the redundant drive typically means data-loss has occurred.

Traditional RAID subsystems attempt to mitigate the probability of hitting this condition via background data scrub operations designed to find and repair LSEs prior to occurrence of data loss following a disk failure. However, if an LSE is found in response to a host input/output (I/O), most RAID subsystems repair the single specific LSE encountered (using RAID) and complete the associated I/O to the host, but do nothing to expedite the discovery and repair of LSEs that likely lie in wait within the logically adjacent address ranges. If a disk failure occurs prior to the background data scrub operation gets to the affected area of disk, data loss will have occurred.

SUMMARY

In one aspect of the present disclosure, a disk-error detection system may include a storage array having a plurality of storage disks configured to store data. The disk-error detection system may include a processor in communication with the storage disks. The processor may detect presence of a media error in a storage disk from the plurality of storage disks during a read operation of the data stored on the storage disk. The processor may perform a media-error detection scan of a predetermined portion of the storage disk in response to the detection of the media error. The location on the storage disk of the predetermined portion of the storage disk may be based on location of the media error on the storage disk.

According to another aspect of the present disclosure, a method may include detecting a media error in a storage disk during a read operation of data stored in the storage disk. The method may further include performing a media-error detection scan of a predetermined portion of the storage disk in response to detection of the media error.

According to another aspect of the present disclosure, a computer-readable medium encoded with a plurality of instructions executable by a process. The plurality of instructions may include instructions to detect a media error in a storage disk during a read operation of data stored in the storage disk. The plurality of instructions may further include instructions to perform a media-error detection scan of a predetermined portion of the storage disk in response to detection of the media error.

The various aspects of the disclosure may be implemented as a system, method, or instructions stored on computer-readable media or may be implemented as a combination thereof.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

FIG. 5 is an operational flow diagram a portion of the example media-error detection scan of the storage disk of FIG. 4.

FIG. 6 is an operational flow diagram of another portion of the example media-error detection scan of the storage disk of FIG. 4.

DETAILED DESCRIPTION OF THE DRAWINGS

Latent sector errors (LSEs) may occur within hard disk drives (HDDs) during operation, resulting in disk sectors on disks of the HDD's to become inaccessible. In one example, an LSE may include media errors on a disk that have not yet been detected. LSEs are significant due to the threat of temporary or permanent data loss upon discovery. In storage device implementations using redundant array of independent disks (RAID), these latent sector errors may cause data loss during reconstruction after disk failure. Studies have been performed indicating that the probability of another LSE occurrence is directly proportional to the proximity of a detected LSE. As shown in a study by entitled "An Analysis of Latent Sector Errors in Disk Drives" by Bairavasundaram et al., *SIGMETRICS*, ACM 978-1-59593-639-4/01/0006, 2007 (hereinafter "LSE study"), which is hereby incorporated by reference in its entirety, such findings are shown. In particular, the LSE study indicates that at least some correlation exists between the likelihood of finding another media error and the proximity of an originally-detected LSE.

Figure 1:
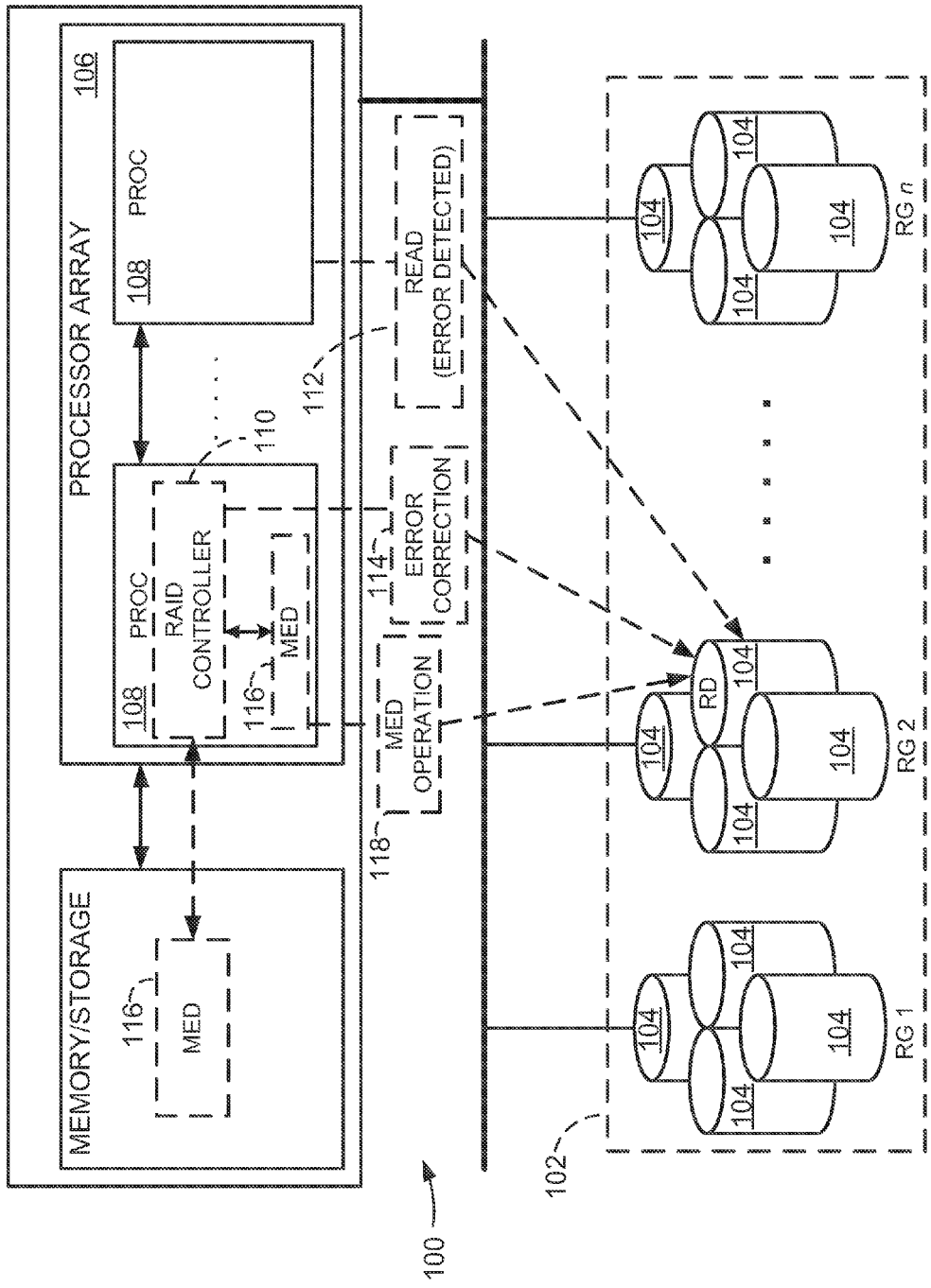
FIG. 1 is a block diagram of an example computer system.

Based on these findings, upon detecting of an LSE or media error, it may be beneficial to scan for other media errors based on the proximity to the detected LSE. FIG. 1 is an example configuration of a computer system 100 that includes an array of storage devices 102 such as HDDs. The computer system 100 may use RAID in maintaining the data stored on each HDD 104 of the storage device. The computer system 100 may represent any system that may implement large amounts of storage such as database systems or any other system that implements RAID or another redundancy layer to repair LSEs.

The array 102 may be arranged into multiple RAID groups, individually designated as RG 1 through RG n. The computer system 100 may include a processor array 106 including one or more processors 108. The computer system 100 may also include a RAID controller module 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The RAID controller module 110 may be a separate card or may be executed on in the processor array 106 or may be some combination thereof.

During operation, an attempt to read data stored in one of the HDDs 104 may be made. In FIG. 1, the HDD 104 being read is designated as a read drive (RD). The read operation 112 may result in detection of a media error, thus an LSE has been detected. Upon detection of such an error the RAID controller module 110 may be used to perform a correction 114 of the defect in the HDD 104 through various RAID techniques, such as regeneration of the missing data from the remaining RG members 104 and rewriting that data back to the RD in a reallocated portion of the RD.

Upon correction of the error, a media error detection (MED) module 116 may be implemented. The MED module 116 may perform MED operations 118 that include a media-error inspection of other areas of the disks of the HDDs 104 based on the proximity to the logical address of the error detected during the read operation 112.

While logical addressing in some HDDs may not be a direct correspondence to the physical location of the logical address on the disk, the LSE study indicates that there is at least some correlation between the probability of detection of other media errors and the proximity from a detected LSE. Based on this correlation, in one example, the MED module 116 may inspect parts of disks of the HDDs 104 within a particular proximity to the detected error. In one example, the proximity may be a system-wide predetermined value. In other examples, the proximity may be set per RAID group or may be on an individual HDD basis.

Figure 2:
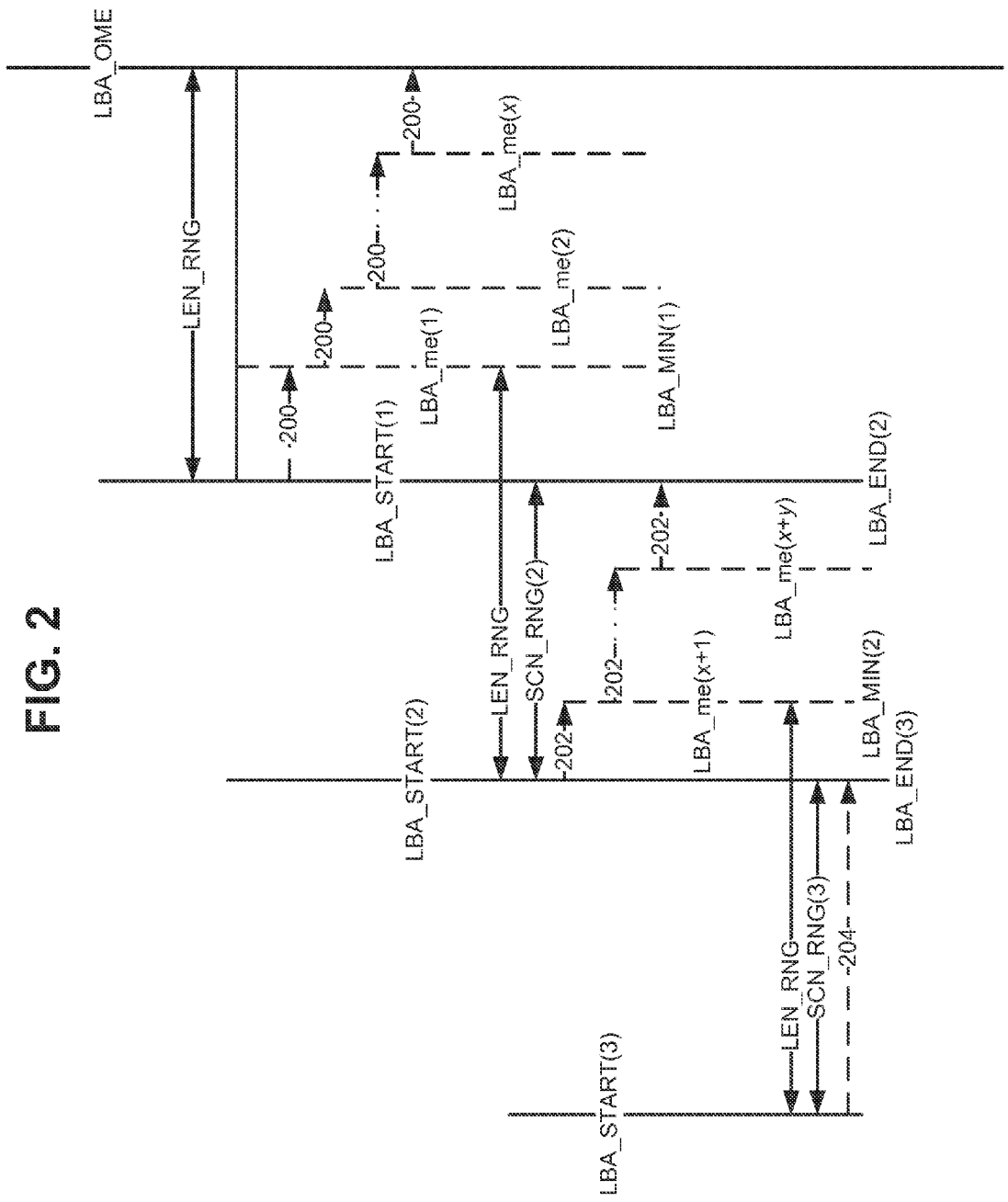
FIG. 2 is an operation diagram of an example media-error detection scan of a storage disk.
Figure 3:
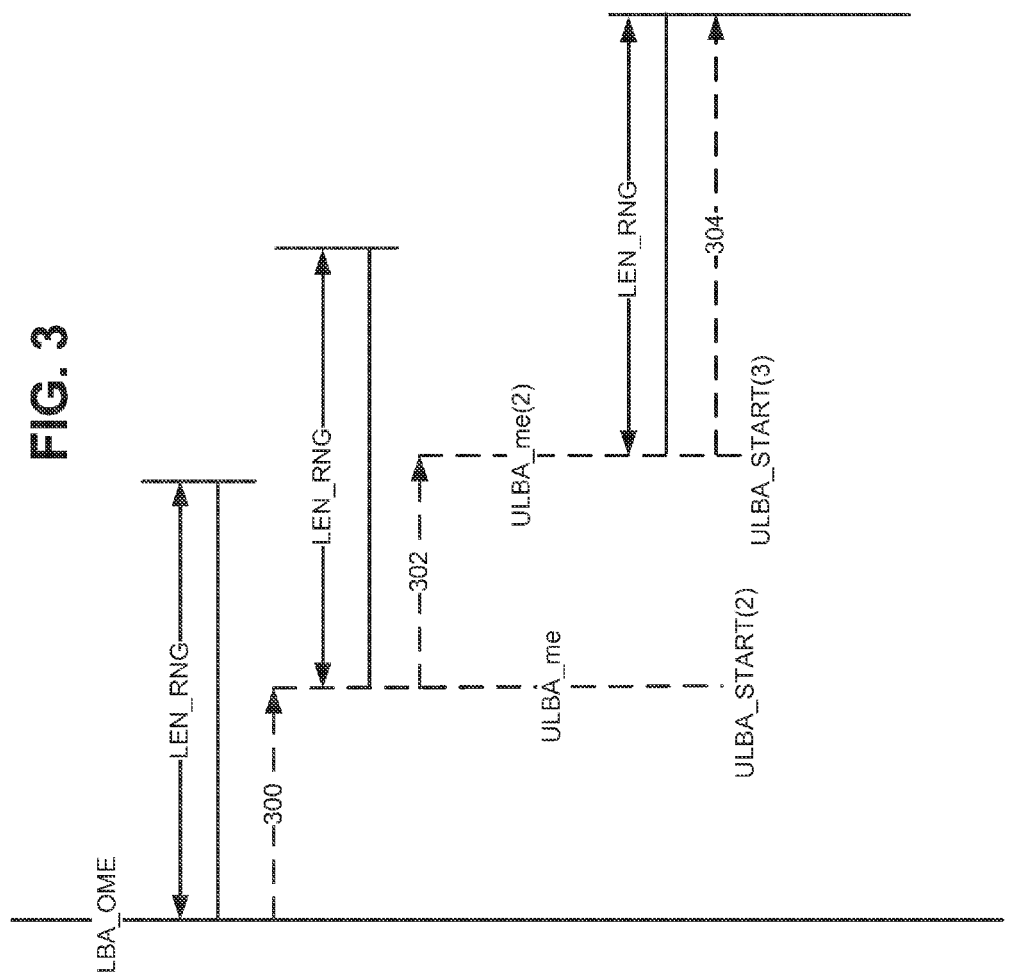
FIG. 3 is another operation diagram of an example media-error detection scan of a storage disk.

FIGS. 2 and 3 provide an example operation diagram of the MED module 116. Upon detection and correction of the read error, the MED module 116 may perform an inspection of logical addresses both below and above the logical block address at which the read error occurred. In FIGS. 2 and 3, this logical block address is designated as LBA_OME, which represents the logical block address ("LBA") of the original media error ("OME"). Using the predetermined proximity value, the MED module 116 may begin a scan 200 at a logical address block at a value lower than the LBA_OME by the predetermined proximity value. This scan starting point is designated as LBA_START(1) in the FIG. 2. The scan 200 may be performed for the logical block address LBA_START (1) and logical block addresses between LBA_START(1) and LBA_OME. This scan range is designated as LEN_RNG.

During the scan 200, another media error may be detected, designated as LBA_me(1). After detection of the media error LBA_me(1), appropriate correction may be performed by the RAID controller 110. After correction, the MED module 116 may continue the scan 200 over the range LEN_RNG. In one example, errors LBA_me(2) through LBA_me(x) may be detected. As each single media error is detected, the scan 200 may be suspended while each error is corrected via the RAID controller 110. The scan 200 of range LEN_RNG may be continued until the logical block address LBA_OME is reached.

Each media error found in the scan 200 over the range LEN_RNG may carry with it the probabilities associated with finding other proximate media errors with respect to the LSE study. Thus, a scan of logical block addresses lower than the media error found during the scan 200 at the lowest logical block address may be desirable. This lowest logical block address found during the scan 200 is LBA_me(1), which the MED module 116 may designate as the LBA_MIN(1). Using the logical block address LBA_MIN(1) as a reference point, MED module 116 may again select a logical block address to begin a scan 202. This logical block address may be the difference between the logical block address LBA_MIN(1) and the predetermined scan range value, which is LBA_MIN (1)-LEN_RNG in FIG. 2. This starting logical block address value is designated as LBA_START(2) in FIG. 2. However, since the logical block addresses between LBA_START(1) and LBA_MIN(1) were previously scanned during the scan 200, the scan 202 may performed between LBA_START(2) and LBA_START(1), which is also designated as LBA_END (2). The scan range of the scan 202 is designated as SCN_RNG(2) in FIG. 2

During the scan 202, other media errors may be detected. For example, media error may be found at LBA_me(x+1). Upon detection of this error, the error may be corrected by the RAID controller 114. As the scan 202 continues, other errors may be found and individually corrected by the RAID controller 110 upon detection. The last error is found between LBA_START (2) and LBA_END(2) at logical address block LBA_me(x+y), where y is a number of errors found after the error found at LBA_me(x+1). Since errors were found during the scan 202, upon correction of this last error found during the scan 202, the MED module 116 may continue to scan lower logical block addresses. A scan 204 may be performed beginning at a logical block address that is less than the lowest logical block address where a media error was detected, LBA_me(x+1), by a value of LEN_RNG. In FIG. 2, this starting logical block address is designated as LBA_START (3) and the scan 204 is set to scan a range of SCN_RNG(3), which is the distance between LBA_START(3) and LBA_START(2) since the range between LBA_START(2) and LBA_me(x+1) has previously been scanned during the scan 202. Thus, the scan 204 is complete when reaching LBA_START(2), which is also designated as LBA_END(3) to indicate the end logical block address of the scan 204.

If no errors are found within the range SCN_RNG(3), the scan of logical block addresses below the logical block address of the original media error, LBA_OME is complete, as shown in FIG. 2. However, each error found during a particular scan may result in a subsequent scan being performed at lower logical block addresses, such as that shown for scans 200 and 202. These subsequent scans may continue to be performed until no media errors are detected during a scan or some other condition occurs, such as termination of the scan if the RAID controller module 110 determines that the HDD 104 being scanned is degraded beyond a tolerable level. This determination may be based on the number of media-errors detected after the original media error is detected, the number of scan range iterations, or an internal predictive logic that may determine drive failure is imminent based on current disk drive conditions. Another scan-termination condition may be based on reaching the beginning of the HDD 104, e.g., a logical block address of zero.

Once scans of the lower logical block addresses are complete, a scan of logical block addresses greater than LBA_OME may be performed. In one example, the MED module 116 may begin scanning a disk from a logical block address adjacent LBA_OME over a range of LEN_RNG. If an error is detected, another scan with a range of LEN_RNG may begin from the logical block address of the detected error. Each time an error is detected, another scan may begin from the logical block address adjacent to that of the detected error over a range LEN_RNG of logical block addresses. This process continues until no errors are found over the last scan.

FIG. 3 provides an example of such operation. In FIG. 3, the initial upper logical block address scanning begins at the logical address block adjacent LBA_OME. The initial scan range is set to a range of LEN_RNG greater than LBA_OME. A scan 300 may begin. An error is detected within this range at a logical block address designated as ULBA_me. The media error may be corrected by the RAID controller 110 and the MED module 116 may designate ULBA_me as a new scan starting address, ULBA_START(2). Another scan 302 may be initialized by the MED module 116 to scan logical block addresses from an address adjacent ULBA_START(2) over a range of LEN_RNG. During the scan 302, another media error may be detected at the logical block address of ULBA_me(2), which may be corrected via the RAID controller 110. Upon correction, the MED module 116 may designate ULBA_me(2) as ULBA_START(3) and begin performance of the scan 304 at a logical block address adjacent ULBA_START(3) over a range of LEN_RNG. No errors were detected over the scan 304, and thus, the scanning by the MED module 116 is complete. However, if an error had been found during the scan 304, another scan would occur over an initial range of LEN_RNG from the occurrence of the media error. These extensions would continuously be performed until no media errors were detected over a range of LEN_RNG from the last detected media error or if any other recognized scan-termination conditions occur, such as reaching the end of the accessible logical block addresses of the HDD 104.

Figure 4:
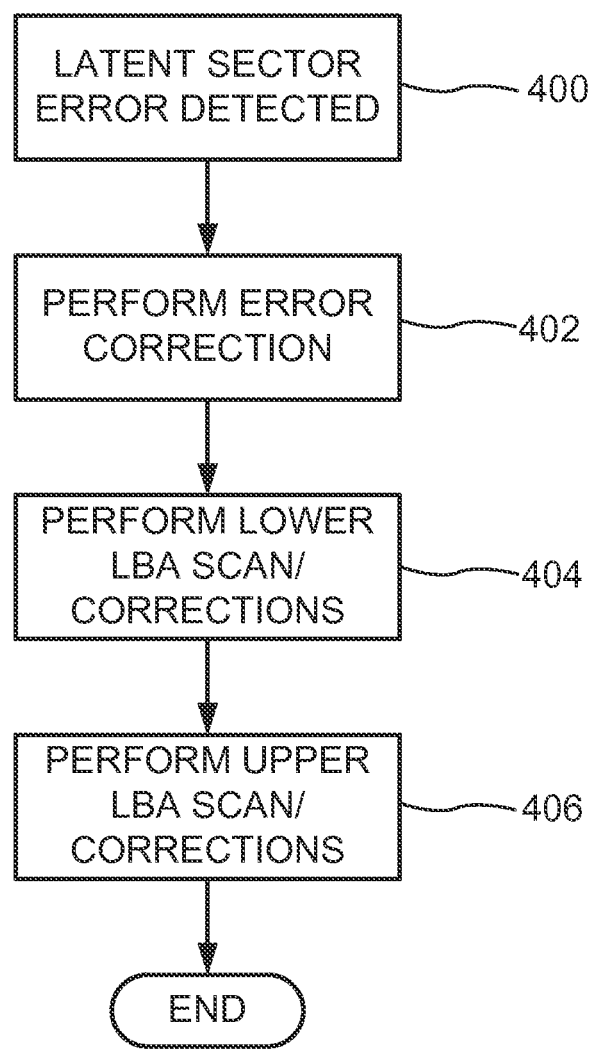
FIG. 4 is an operational flow diagram of a media-error detection scan of a storage disk.

FIG. 4 is an operational flow diagram of example operation of the computer system 100 during scan and detection of media errors in the array of storage devices 102. In one example, a read error may occur based on the existence of a latent sector error, which may be detected when the computer system 100 attempts to read data from one of the HDDs 104 (400). Error correction may occur via the RAID controller 110 (402). Upon correction of the error, MED module 116 may perform a scan and correction of any detected media errors of lower LBAs (404) with respect to the logical block address of the originally-detected media error. Upon completion of the scan of lower LBAs, the MED module 116 may perform a scan and correction of any detected media errors of upper LBAs with respect the LBA of the originally detected error. Upon completion of the scan/corrections of the upper LBAs, scanning by the MED module 116 may cease until another media error is detected.

FIG. 5 is an operational flow diagram of example operation of the MED module 116 during a lower LBA scan. In FIG. 5, the lower LBA scan may be initiated upon detection of a latent sector error (500). The error may be corrected via the RAID controller 110. The MED module 116 may initially define a scan range (504) based on the logical block address of the originally-detected error, which is designated as LBA_OME. The scan range may be based on predetermined scan range value, such as LEN_RNG. Thus, the scan range will begin at a logical block address that is lower in value from the LBA_OME by a value of LEN_RNG. This starting point is designated as LBA_START(1).

The MED module 116 may begin the scan at LBA_START (1) (506). If no error is detected, the MED module 116 may begin the upper LBA scan (see FIG. 6). If an error is detected during the scan (508), the error may be designated as the lowest logical block address to be identified, LBA_MIN(1) (510). This media error may be corrected via the RAID controller (512). The MED module 116 may continue to scan over the scan range (514). If another media error is detected (516) during the scan over this range, the media error may be corrected (512) and the scan may continue (514).

Upon completion the of the scan in which errors were detected, the MED module 116 may reset the scan range to perform further error detection searching at lower logical block addresses (518). In one example, the MED module 116 select a new starting point to perform a scan. In one example, this may be a logical block address that is less in value of LBA_MIN(1) by a value of LEN_RNG. This new starting point may be designated as LBA_START(2). However, since LBAs between LBA_START(1) and LBA_MIN(1) were previously scanned, the scan range will be over the logical block addresses starting at and including LBA_START(2).

Once the new scan range is initialized, the MED module 116 may begin the scan (520). If no media error is found, the MED module 116 may begin the upper LBA scan (see FIG. 6). However, if an error is found within the new scan range, a new scan will be performed after the scanning of the current range is complete. The first error found during the current scan may be used as the reference point for selecting the starting logical block address for the subsequent scan (510). The MED module 116 may correct this first media error (512) found in the new scan range and continue scanning the current range (514) with any subsequent errors being corrected. Once the current range is scanned, the new range may be selected (518) and scanned (520). This cycle may continue until no errors are detected within a current range being scanned. Once this occurs, the MED module 116 may begin a scan of the upper LBAs.

FIG. 6 is an operational flow diagram of example scanning of the upper LBAs by the MED module 116. In one example, the MED module 116 may define the initial scan range based on the originally-detected media error at LBA_OME (600). This initial scan range may be based on a predetermined range value, such as LEN_RNG. The MED module 116 may begin scanning the current scan range (602) to determine if any media errors are present (604). If no media errors are detected, the scan by the MED module 116 may be complete. If a media error is detected, the error may be correct via the RAID controller 110 (606). Upon error correction, the MED module 116 may extend scanning from the logical block address at which the error is detected (608). In one example, the range of the scan extension may be the predetermined range value LEN_RNG. Another scan over the extended range may begin. (610) If another media error is detected (604), the error may be corrected (606) and again the scan range may be extended by LEN_RNG (608) from the local block address of the most recently detected media error and the next scan may occur over the extended range (610). As long as media errors are detected within range being scanned, the media errors will continue to be corrected and the scan ranges extended until no errors are found within a particular scan range. At such point, the MED module 116 may cease scanning.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A disk-error detection system comprising:
   a storage array including a plurality of storage disks configured to store data;
   a processor in communication with the storage disks, wherein the processor is configured to:
   detect presence of an initial media error in a storage disk from the plurality of storage disks during a read operation of the data stored on the storage disk;
   perform an initial media-error detection scan of a portion of the storage disk over a predetermined portion size of the storage disk in response to the detection of the initial media error, wherein location on the storage disk of the portion of the storage disk is based on location of the initial media error on the storage disk; and
   perform an additional media-error detection scan each time at least one media-error is detected in a prior media-error detection scan, wherein each additional media-error detection scan is configured to cover a respective unscanned portion of the storage disk, wherein location of each respective unscanned portion of the storage disk is based on location of a single media-error detected during the prior media error detection scan.

2. The disk-error detection system of claim 1, wherein the processor is further configured to:
   determine a logical block address of the storage disk at which the initial detected media error occurs, wherein the predetermined portion size is a predetermined number of logical block addresses, and wherein the portion of the storage disk is a logical block address range that covers the predetermined number of logical block addresses, and wherein the logical block address range includes the logical block address; and
   perform the initial media-error detection scan of the storage disk over the logical block address range in response to detection of the initial media error.

3. The disk-error detection system of claim 2, wherein the logical block address range includes a first range of logical block addresses and a second range of logical block addresses, wherein the first range of logical block addresses includes logical block addresses lower than the logical block address at which the initial detected media error occurs, and wherein the second range of logical block addresses includes logical block addresses higher than the logical block address at which the initial detected media error occurs.

4. The disk-error detection system of claim 3, wherein the processor is further configured to:
   determine the first range of logical block addresses, wherein determination of the first range of logical block addresses comprises:
   determine a starting logical block address, wherein the starting logical block address is lower than the logical block address of the storage disk at which the initial detected media error occurs by a predetermined range value; and
   set the first range of logical block addresses as a range of logical block addresses between the starting logical block address and the logical block address of the storage disk at which the initial detected media error occurs.

5. The media-error detection system of claim 4, wherein the processor is further configured to:
   set a current scan range to the first range of logical block addresses;
   perform the initial media error detection scan, wherein the performance of the initial media error detection scan comprises a media-error detection scan of the logical block addresses in the current scan range in ascending order, wherein the initial media-error detection scan is configured to be initiated at the starting logical block address;
   detect at least one media-error of the storage disk in the current scan range of the logical block addresses;
   correct each detected media error of the storage disk found in the current scan range of logical block addresses;
   upon completion of the scan of the current scan range of logical block addresses, determine an updated scan range, wherein the updated scan range covers a respective unscanned portion of the storage disk for an additional media-error detection scan, and wherein the updated scan range includes an updated starting logical block address that is lower than a lowest logical block address of a detected media-error within the current scan range by the predetermined range value, and wherein the updated scan range includes logical block addresses between the updated starting logical block address and the previous starting logical block address;
   set the current scan range to the updated scan range; and
   perform the additional media-error detection scan of the scan range over logical block addresses between the update first range of logical block addresses.

6. The disk-error detection system of claim 3, wherein the processor is further configured to:
   determine an updated scan range upon completion of each media-error detection scan having at least one detected media error over the current scan range and correction of any detected media errors over the current scan range, wherein each updated scan range has an updated starting logical block address that is lower than a lowest logical block address of a detected media error in the storage disk within the current scan range, and wherein the updated scan range includes logical block addresses between the updated starting logical block address and the starting logical block address of the current scan range;
   set the current scan range to the updated scan range each time the updated scan range is determined, wherein the current scan range is a respective unscanned portion of an additional media-error detection scan;
   perform the additional media-error detection scan of the current scan range; and
   cease determination of the updated scan range if no media errors are detected during performance of the additional media-error detection scan of the current scan range.

7. The disk-error detection system of claim 3, wherein the processor is further configured to:
   determine the second range of logical block addresses, wherein determination of the second range of logical block addresses comprises:
   determine a starting logical block address, wherein the starting logical block address is a logical block address adjacent the logical block address of the storage disk at which the initial detected media error occurs by a predetermined range value; and
   set the second range of logical block addresses as a range of logical block addresses between the starting logical block address and a logical block address greater than the logical block address of the storage disk at which the initial detected media error occurs by a predetermined range value.

8. The disk-error detection system of claim 7, wherein the processor is further configured to:
   set a current scan range to the second range of logical block addresses;
   perform the initial media-error detection scan of logical block addresses in the current scan range;
   detect a media error in the storage disk within the current scan range;
   correct the media error;
   update the current scan range to begin from a logical block address adjacent a logical block address of the detected media error of the initial media-error detection scan and end at a logical block address that is a number of logical block addresses in the second range of logical block addresses greater than the logical block address of the detected error of the initial media-error detection scan by the predetermined range value, wherein the updated current scan range covers a respective unscanned portion of the storage disk of an additional media-error detections scan; and
   perform the additional media-error detection scan of the updated current scan range;

perform the update of the current scan range each time a media error is detected in the storage disk within the current scan range, wherein each updated current scan range covers a respective unscanned portion of the storage disk of an additional media-error detections scan; and cease to perform the update of the current scan range when no media errors are detected in the storage disk within the current scan range.

9. A method comprising:

detecting, with a processor, a media error in a storage disk during a read operation of data stored in the storage disk;

performing, with the processor, an initial media-error detection scan of a portion of the storage disk over a predetermined portion size of the storage disk in response to detection of the initial media error; and performing an additional media-error detection scan each time at least one media-error is detected in a prior media-error detection scan, wherein each additional media-error detection scan is configured to cover a respective unscanned portion of the storage disk, wherein location of each respective unscanned portion of the storage disk is based on location of a single media-error detected during the prior media error detection scan.

10. The method of claim 9, further comprising selecting, with the processor, a first range of logical block addresses of the storage disk having logical block addresses of the storage disk lower than a logical block address of the initial detected media error and a second range of logical block addresses of the storage disk higher than a logical block address of the initial detected media error, wherein the first range and the second range each span a predetermined range value of logical block addresses, wherein performing, with the processor, the initial media-error detection scan comprises performing a media-error detection scan of the logical block addresses of the first range and the logical block addresses of the second range.

11. The method of claim 9, further comprising:

selecting, with the processor, a starting scan address, wherein the starting scan address is a logical block address of the storage disk lower than the logical block address of the initial detected media error in the storage disk by a predetermined range value; and selecting, with the processor, a current scan range, wherein the current scan starts at the starting scan address and ends at a lowest adjacent logical block address to the logical block address of the initial detected media error, wherein performing, with the processor, the initial media-error detection scan of a portion of the storage disk comprises performing, with the processor, a media-error detection scan of the current scan range.

12. The method of claim 11, further comprising:

detecting, with the processor, at least one media error in the storage disk within the current scan range;

correcting, with the processor, each detected media error;

upon completion of the media-error detection scan of the current scan range, updating, with the processor, the current scan range, wherein updating the current scan range comprises selecting, with the processor, a new start scan address, wherein the new start scan address is a logical block address lower than a lowest logical block address of a detected media error within the current scan range by the predetermined range value, and wherein the updated current scan range ends at a logical block address adjacent to and lower than the previous start scan address, wherein the updated current scan range covers a respective unscanned portion of the storage disk of an additional media-error detection scan; and performing, with the processor, the additional media-error detection scan of the updated current scan range.

13. The method of claim 12, further comprising:

continuing, with the processor, to update the current scan range upon detection of a media error within the current scan range of the storage disk;

performing, with a processor, an additional media-error detection scan of the current scan range each time the current scan range is updated, wherein the updated scan range is a respective unscanned portion of the storage disk of the additional media error detection; and ceasing, with processor, performance of additional media-error detection scans of logical block addresses lower than the logical block address of the media error detected during the read operation in response to no media errors being detected over the current scan range.

14. The method of claim 9, further comprising:

selecting, with the processor, a starting scan address, wherein the starting scan address is a logical block address of the storage disk adjacent to and higher than the logical block address of the detected initial media error in the storage disk; and selecting, with the processor, a current scan range, wherein the current scan range starts at the starting scan address and ends at a logical block address higher than the logical block address of the detected media error by a predetermined range value, wherein performing, with the processor, the initial media-error detection scan of a predetermined portion of the storage disk comprises performing, with the processor, a media-error detection scan of the current scan range.

15. The method of claim 14, further comprising:

detecting, with the processor, at least one media error in the storage disk within the current scan range;

correcting, with the processor, each detected media error;

upon completion of the initial media-error detection scan of the current scan range, updating, with the processor, the current scan range, wherein updating the current scan range comprises selecting, with the processor, a new start scan address, wherein the new start scan address is a logical block address adjacent to and higher than a logical block address of the media error detected during performance of the initial media-error detection scan, wherein the current scan range ends at a logical block address greater than a logical block address of a latest detected media error by the predetermined range value, wherein the updated current scan range is a respective unscanned portion of an additional media-error detection scan; and performing, with the processor, the additional media-error detection scan of the current scan range after the update.

16. The method of claim 15, further comprising:

after each update, for each detected error in the current scan range:

correcting, with the processor, the detected error in the current scan range; and performing, with the processor, an update on the current scan range after the detected error in the current scan range is corrected; and ceasing, with the processor, performance of the media-error detection scan when no media errors are detected in the current scan range.

17. A non-transitory computer-readable medium encoded with a plurality of instructions executable by a processor, the plurality of instructions comprising:

instructions to detect an initial media error in a storage disk during a read operation of data stored in the storage disk;

instructions to select an initial group of logical block addresses based on detection of the initial media error, wherein location of the initial group of logical block addresses is based on location of the initial media error in the storage disk;

instructions to perform a media-error detection scan of the selected group of logical block addresses of the storage disk in response to detection of the initial media error; and instructions to extend the media-error detection scan each time at least one media-error is detected during a scan of a selected range of logical block addresses, wherein each extension of the media-error detection scan is configured to cover a respective group of unscanned logical block addresses of the storage disk, wherein location of each respective group of unscanned logical block addresses of the storage disk is based on location of a single media-error detected during the prior-scanned group of logical block addresses.

18. The non-transitory computer-readable medium of claim 17, wherein the instructions to select the initial group of logical block addresses based on detection of the initial media error, comprise instructions to select a scan range of logical block addresses in the storage disk to scan, wherein the scan range begins at a logical block address lower than a logical block address of the detected initial media error by a predetermined range value, wherein instructions to perform a media-error detection scan comprise:

instructions to perform a media-error detection scan over the selected scan range; and instructions to correct each media error detected during performance of the media-error detection scan, wherein the instructions to extend the media-error detection scan comprise:

instructions to extend the scan range in response to completion of the media-error detection scan of the selected scan range and detection of at least one media error detected during performance of the media-error detection scan, wherein the extended scan range includes a scan range between a logical block address lower than a lowest logical block address of a media-error detected and a logical block address adjunct to and lower than the logical block address at which the precedent scan began; and instructions to extend the scan range in response to detection of at least one media error during performance of a media-error detection scan during a most-recently performed media-error detection scan and the completion of the most-recently performed media-error detection scan.

19. The non-transitory computer-readable medium claim of claim 18, wherein the instructions to select an initial group of logical block addresses based on detection of the initial media error comprise:

instructions select a second scan range of logical block addresses in the storage disk to scan, wherein the second scan range begins at a logical block address higher than and adjacent to the logical block address of the detected media error and ends at a logical block address higher than the logical address block of the detected media error by a predetermined range value, wherein the instructions to perform a media-error detection scan comprise instructions to perform a media-error detection scan over the selected second scan range; and upon detection of a media error during the media-error detection scan of the second scan range:

instructions to correct the media-error detected during the media-error detection scan of the second scan range, wherein the instructions to extend the media-error detection scan comprise instructions to extend the second scan range from a logical block address of the media error detected during the scan of second scan range by the predetermined range value;

instructions to perform a media-error detection scan of the extended second scan range; and instructions to extend the second scan range upon each subsequent media-error detected and perform the media-error detection scan of the extended scan range upon correction of each subsequent media-error.

20. The non-transitory computer-readable medium of claim 19, wherein the plurality of instructions further comprises:

instructions to cease performing a scan of the extended scan range if no media errors are detected within the extended scan range; and instructions to cease performing a scan of the extended second scan range if no media errors are detected within the extended second scan range.

* * * * *